A. M. LAYCOCK.
SPRING.
APPLICATION FILED OCT. 9, 1915.
1,174,589.
Patented Mar. 7, 1916.
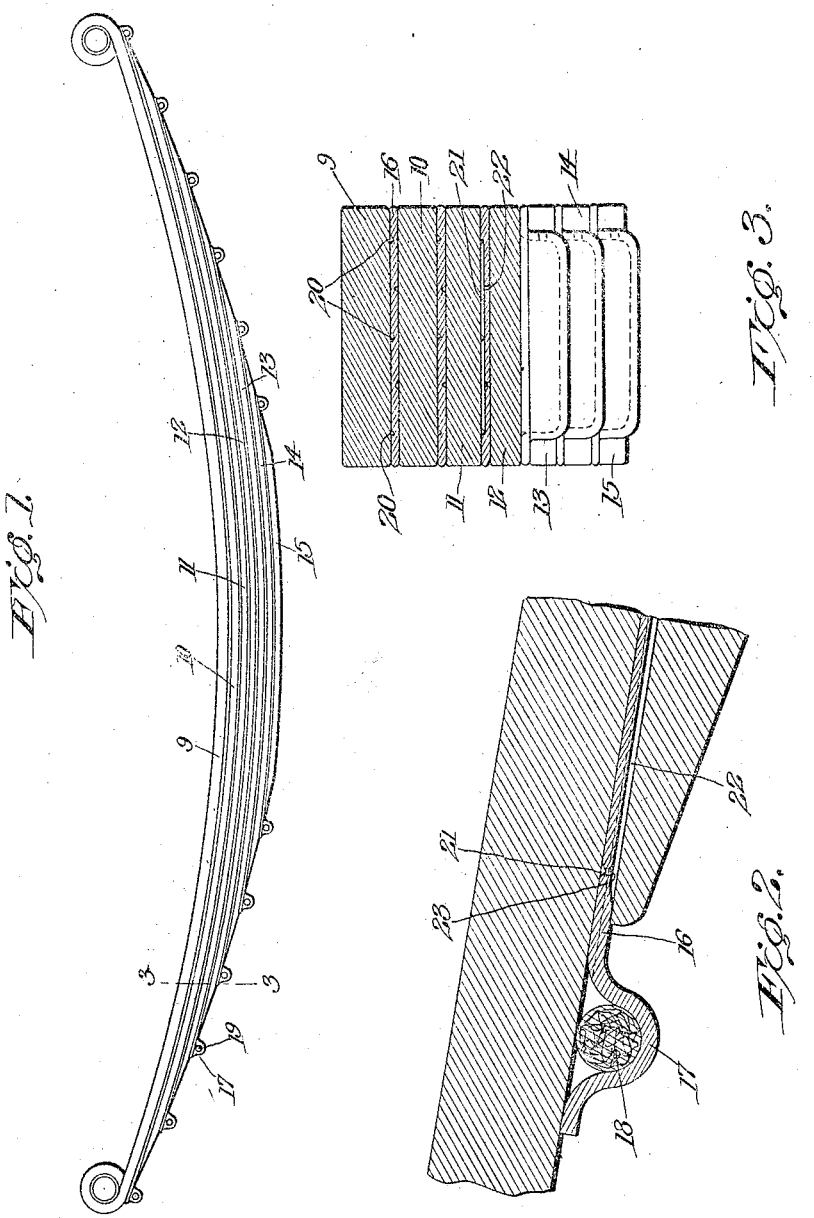

UNITED STATES PATENT OFFICE.

ARTHUR MAUNDER LAYCOCK, OF KINGSTON, PENNSYLVANIA.

SPRING.

1,174,589.      Specification of Letters Patent.      Patented Mar. 7, 1916.

Application filed October 9, 1915. Serial No. 55,057.

*To all whom it may concern:*

Be it known that I, ARTHUR M. LAYCOCK, a subject of the King of Great Britain, and resident of Kingston, county of Luzerne, State of Pennsylvania, have invented certain new and useful Improvements in Springs, of which the following is a specification.

This invention relates to vehicle springs and more particularly to leaf springs and means for lubricating the leaves.

It is the object of the invention to provide a simple and comparatively inexpensive lubricating means adapted to be arranged between the leaves of the spring and effectively lubricate all surfaces which are subjected to wear.

Other objects and the features of novelty will be apparent from the following description taken in connection with the accompanying drawings, in which, Figure 1 is a side elevation of a semi-elliptical spring embodying my invention; Fig. 2 is an enlarged fragmentary longitudinal section of the end portion of one of the lubricating devices, shown in the relation to the adjoining leaves; Fig. 3 is a transverse section on the line 3—3 of Fig. 1.

Referring to the drawings 9, 10, 11, 12, 13, 14 and 15 represent a series of superposed leaves having upturned end portions and together constituting a semi-elliptical spring. It will be observed that the leaf 15, on the bottom of the spring, is shorter than the others and that the intermediate leaves are successively longer, each of the leaves projecting beyond the ends of the leaf immediately below. Arranged between the leaves are plates 16 having at their ends depressions or pockets 17 to receive a wad 18 of absorbent material, or other lubricating means. Each of the pockets 17 is provided with an opening 19 permitting the introduction of a lubricant. Longitudinally extending grooves 20 are arranged in the upper surface of each of the plates 16 and transverse grooves 21 connect the longitudinal groopes 20 with other longitudinal grooves 22 on the lower side of the plates 16, by means of suitable perforations 23.

It will be understood that the transverse grooves 21 may be in the upper or lower surface of the plates 16 and that they are shown as being in the upper surface only by way of example.

The plates 16 may be of bronze or other suitable wearing metal or they may be of steel and thus reinforce the leaves of the spring. Where the plates 16 are made of bronze they conform closely to the surfaces of the leaves and thus support the leaves throughout their entire area and avoid concentration of the wear at the edges of the leaves, which has heretofore occurred, on account of the usual slight concavity of the surfaces of the springs.

The lubricant is distributed from the pockets 17 through the grooves 20. 21 and 22 and the placing of the pockets at the ends of the plates 16 enables this distribution to be effected by gravity as well as by capillary attraction, on account of the ends of the leaves being upturned and therefore being higher than the middle portions thereof.

Having described the invention what is claimed and desired to be secured by Letters-Patent is, 1. In leaf spring construction, the combination of a plurality of superposed leaves having upturned ends, the leaves being progressively longer from the lower to the top leaf, plates arranged between the leaves and having pockets, below the ends of the leaves adjoining them on their upper sides, and grooves extending longitudinally of the leaves from said pockets, and lubricating means in said pockets.

2. In leaf spring construction, the combination of a plurality of superposed leaves having upturned ends, the leaves being progressively longer from the lower to the top leaf, plates arranged between the leaves and having pockets, below the ends of the leaves adjoining them on their upper sides, and a series of perforations and communicating transverse and longitudinal grooves, and lubricating means in said pockets for supplying said grooves.

3. In a leaf spring construction, the combination of a plurality of superposed leaves having upturned ends, the leaves being progressively longer from the lower to the top leaf, plates arranged between the leaves and having pockets below the ends of the leaves adjoining them on their upper sides, and a series of perforations and communicating transverse and longitudinal grooves, lubricating means in said pockets, and means whereby lubricant may be introduced into the pockets.

In testimony whereof I affix my signature.

ARTHUR MAUNDER LAYCOCK.